US012561991B2

(12) United States Patent
Ka et al.

(10) Patent No.: US 12,561,991 B2
(45) Date of Patent: Feb. 24, 2026

(54) COOKING APPARATUS AND CONTROL METHOD THEREOF

(71) Applicant: SAMSUNG ELECTRONICS CO., LTD., Suwon-si (KR)

(72) Inventors: Keehwan Ka, Suwon-si (KR);
Jongyoub Ryu, Suwon-si (KR);
Kyoungchoon Park, Suwon-si (KR);
Minjin Song, Suwon-si (KR);
Jeongwon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 305 days.

(21) Appl. No.: 18/142,918

(22) Filed: May 3, 2023

(65) Prior Publication Data

US 2023/0274561 A1 Aug. 31, 2023

Related U.S. Application Data

(63) Continuation of application No. PCT/KR2022/017193, filed on Nov. 4, 2022.

(30) Foreign Application Priority Data

Nov. 5, 2021 (KR) ........................ 10-2021-0151685

(51) Int. Cl.
*G06K 9/00* (2022.01)
*F24C 7/08* (2006.01)
(Continued)

(52) U.S. Cl.
CPC ................ *G06V 20/68* (2022.01); *F24C 7/08* (2013.01); *F24C 15/00* (2013.01); *G06T 7/80* (2017.01); *G06V 10/42* (2022.01)

(58) Field of Classification Search
CPC ............. G06T 7/80; G06T 2207/30128; G06T 2207/30168
See application file for complete search history.

(56) References Cited

U.S. PATENT DOCUMENTS 8,660,297 B2 2/2014 Yoon et al.
10,398,260 B2 9/2019 Park et al.
(Continued)

FOREIGN PATENT DOCUMENTS

JP 10-238785 9/1998
JP 2011-77007 4/2011
(Continued)

OTHER PUBLICATIONS

International Search Report dated Feb. 14, 2023 issued in Korean Application PCT/KR2022/017193.
(Continued)

*Primary Examiner* — Molly Wilburn
*Assistant Examiner* — Aidan Keup
(74) *Attorney, Agent, or Firm* — STAAS & HALSEY LLP

(57) ABSTRACT

A cooking apparatus includes a cooking chamber configured to receive food, a camera to photograph inside the cooking chamber, the camera having a lens, a memory configured to store a plurality of cooking control information used to cook the food, and a processor configured to control the camera to photograph the food inside the cooking chamber, wherein the processor is configured to extract state information of the food from the photographed image, and determine a contamination degree of the photographed image according to contamination of the lens of the camera, correct the state information of the food based on the determined contamination degree, acquire first cooking control information corresponding to the corrected state information; and, con- (Continued)

PHOTOGRAPHED IMAGE OF FOOD
BEFORE LENS CONTAMINATION

PHOTOGRAPHED IMAGE OF FOOD
AFTER LENS CONTAMINATION

210

221

222 trol the cooking chamber to cook the food according to the acquired cooking control information by acquiring cooking control information.

15 Claims, 12 Drawing Sheets

(51) Int. Cl.

| | | |
|---|---|---|
| *F24C 15/00* | (2006.01) | |
| *G06T 7/80* | (2017.01) | |
| *G06V 10/42* | (2022.01) | |
| *G06V 20/68* | (2022.01) | |

(56) References Cited

U.S. PATENT DOCUMENTS

| | | |
|---|---|---|
| 11,531,891 B2 | 12/2022 | Maeng |
| 2012/0076900 A1 | 3/2012 | Yoon et al. |
| 2017/0261213 A1 | 9/2017 | Park et al. |
| 2020/0019861 A1 | 1/2020 | Jeong |
| 2020/0161329 A1 | 5/2020 | Park et al. |
| 2020/0182667 A1 | 6/2020 | Mayle et al. |
| 2021/0148034 A1 | 5/2021 | Park et al. |

| | | | |
|---|---|---|---|
| 2021/0262670 A1 | 8/2021 | Clayton et al. | |
| 2021/0285653 A1 | 9/2021 | Bhogal et al. | |
| 2022/0065536 A1* | 3/2022 | Beckmann | G01N 21/25 |
| 2022/0400893 A1* | 12/2022 | Daly | G03B 35/08 |

FOREIGN PATENT DOCUMENTS

| | | |
|---|---|---|
| JP | 6868463 | 5/2021 |
| KR | 10-2010-0134420 | 12/2010 |
| KR | 10-2016-0069344 | 6/2016 |
| KR | 10-2017-0106143 | 9/2017 |
| KR | 10-1778561 | 9/2017 |
| KR | 10-2019-0105531 | 9/2019 |
| KR | 10-2021-0059532 | 5/2021 |
| KR | 10-2021-0066452 | 6/2021 |
| KR | 10-2021-0074648 | 6/2021 |
| WO | WO 2021/184003 A1 | 9/2021 |

OTHER PUBLICATIONS

Written Opinion dated Feb. 14, 2023 issued in Korean Application PCT/KR2022/017193.
European Search dated Jul. 16, 2024 issued in European Patent Application No. 22890427.2.

* cited by examiner

PHOTOGRAPHED IMAGE OF FOOD
BEFORE LENS CONTAMINATION

PHOTOGRAPHED IMAGE OF FOOD
AFTER LENS CONTAMINATION

210—

—221

—222

<u>100</u>

100

COOKING APPARATUS AND CONTROL METHOD THEREOF

CROSS-REFERENCE TO RELATED APPLICATION(S)

This application is a continuation application, under 35 U.S.C. § 111 (a), of an International application No. PCT/KR2022/017193, filed on Nov. 4, 2022, which is based on and claims the benefit of a Korean patent application number 10-2021-0151685, filed on Nov. 5, 2021, in the Korean Intellectual Property Office, the disclosure of which is incorporated by reference herein in its entirety.

BACKGROUND

1. Field

The disclosure relates to a cooking apparatus and a control method thereof. More particularly, the disclosure relates to a cooking apparatus for acquiring state information of food a photographed image of food inside a cooking chamber and cooking food according to the state information of the food, and a control method thereof.

2. Description of Related Art

A cooking apparatus is an apparatus capable of performing various cooking functions, such as baking, frying, boiling, or the like. Recently, a cooking apparatus equipped with a camera in the cooking apparatus to photograph food to acquire information about the food has been developed.

However, the prior cooking apparatus has a problem in that when food is photographed in a state where a camera lens is contaminated due to steam or foreign substances generated inside the cooking chamber, information about the food from the photographed image is unreliable.

SUMMARY

The disclosure is to solve the problem described above, and an object of the disclosure is to provide a cooking apparatus for performing automatic cooking by correcting state information of food extracted from a photographed image according to a degree of contamination of a camera lens, and a control method thereof.

In addition, an embodiment of acquiring state information of food using sensing information other than the photographed image is included when reliable state information cannot be acquired from the photographed image since the lens is excessively contaminated.

In order to achieve the above object, according to an embodiment of the disclosure, there is provided a cooking apparatus comprising a cooking chamber configured to receive food, a camera to photograph inside the cooking chamber, the camera having a lens, a memory configured to store a plurality of cooking control information used to cook the food and, a processor configured to control the camera to photograph the food inside the cooking chamber. The processor is further configured to extract state information of the food from the photographed image, and determine a contamination degree of the photographed image according to contamination of the lens of the camera, correct the state information of the food based on the determined contamination degree, acquire cooking first control information corresponding to the corrected state information, and control the cooking chamber to cook the food according to the acquired first cooking control information.

The processor is further configured to, based on the determined contamination degree being equal to or greater than a first threshold, acquire second cooking control information corresponding to a result sensed by at least one another sensor stored in the memory, and control the cooking chamber to cook the food according to the acquired second cooking control information.

The processor is further configured to, based on the determined contamination degree being less than the first threshold value and greater than or equal to a second threshold value, acquire cooking control information corresponding to state information corrected based on the contamination degree from the memory, and based on the contamination degree being less than the second threshold value, acquire cooking control information corresponding to uncorrected state information from the memory.

The apparatus may further comprises a temperature sensor and a timer, wherein the processor is further configured to, based on the contamination degree being equal to or greater than the first threshold value, estimate the state information of the food based on a temperature change sensed by the temperature sensor and a time counted by the timer, and acquire cooking control information corresponding to the estimated state information from the memory.

The processor is further configured to, determine the contamination degree by comparing a size of a region of interest in which the food is identified in the photographed image and a size of a region occluded due to contamination of the lens of the camera, and correct the state information by adjusting a state value of at least one of a shape, a color, and a size of the food in proportion to the contamination degree.

The memory is configured to store a plurality of food change patterns corresponding to each of the plurality of cooking control information, and wherein the processor is further configured to acquire a change pattern of the state information by accumulating the state information of the food for a predetermined time; and search, from the memory, a food change pattern matching the acquired change pattern, and acquire cooking control information corresponding to the searched food change pattern.

The processor is further configured to, based on the food change pattern matching the acquired change pattern being not searched from the memory, search, in the memory, a food change pattern matching the acquired change pattern with a variable change pattern.

According to an embodiment of the disclosure, there is provided a method for controlling a cooking apparatus, the method comprising photographing food inside a cooking chamber through a camera of the cooking apparatus, extracting state information of the food from the photographed image photographed by the camera, determining a contamination degree of the photographed image according to contamination of a lens of the camera, correcting the state information of the food based on the determined contamination degree, acquiring cooking control information corresponding to the corrected state information from the cooking apparatus, the cooking apparatus storing a plurality of cooking control information, and controlling a cooking of the food according to the acquired cooking control information.

The acquiring may include, based on the determined contamination degree being equal to or greater than a first threshold, acquiring first cooking control information corresponding to a result sensed by at least one another sensor, and the cooking may include cooking the food according to the acquired first cooking control information.

The acquiring may include, based on the determined contamination degree being less than the first threshold value and greater than or equal to a second threshold value, acquiring second cooking control information corresponding to state information corrected based on the contamination degree and based on the determined contamination degree being less than the second threshold value, acquiring third cooking control information corresponding to uncorrected state information.

The cooking apparatus may further comprise a temperature sensor and a timer, and the acquiring may include, based on the determined contamination degree being equal to or greater than the first threshold value, estimating the state information of the food based on a temperature change sensed by the temperature sensor and a time counted by the timer, and acquiring cooking control information corresponding to the estimated state information.

The determining the contamination degree may include calculating the contamination degree by comparing a size of a region of interest in which the food is identified in the photographed image and a size of a region occluded due to contamination of the lens of the camera, and the correcting may include correcting the state information by adjusting a state value of at least one of a shape, a color, and a size of the food in proportion to the contamination degree.

The cooking apparatus is configured to store a plurality of food change patterns corresponding to each of the plurality of cooking control information, and the acquiring may include acquiring a change pattern of the state information by accumulating the state information of the food for a predetermined time, and searching a food change pattern matching the acquired change pattern and acquiring cooking control information corresponding to the searched food change pattern.

The searching may include, based on the food change pattern matching the acquired change pattern being not searched from the cooking apparatus, searching a food change pattern matching the acquired change pattern with a variable change pattern.

According to an embodiment of the disclosure, there is provided A computer program product comprising a memory device that comprises one or more computer executable instructions that when executed by one or more processors cause the one or more processors of a cooking apparatus to perform a method, the method may comprise photographing food inside a cooking chamber through a camera of the cooking apparatus, extracting state information of the food from the photographed image photographed by the camera, determining a contamination degree of the photographed image according to contamination of a lens of the camera, correcting the state information of the food based on the determined contamination degree, acquiring cooking control information corresponding to the corrected state information from the cooking apparatus, the cooking apparatus storing a plurality of cooking control information and controlling a cooking of the food according to the acquired cooking control information.

4

Figure 2:
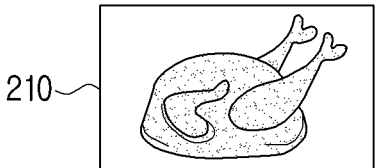
Figure 2:
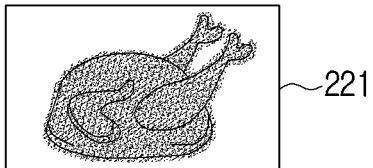
Figure 2:
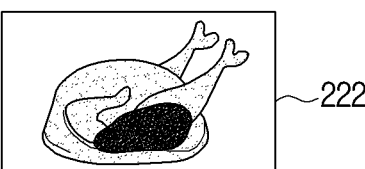
Figure 3:
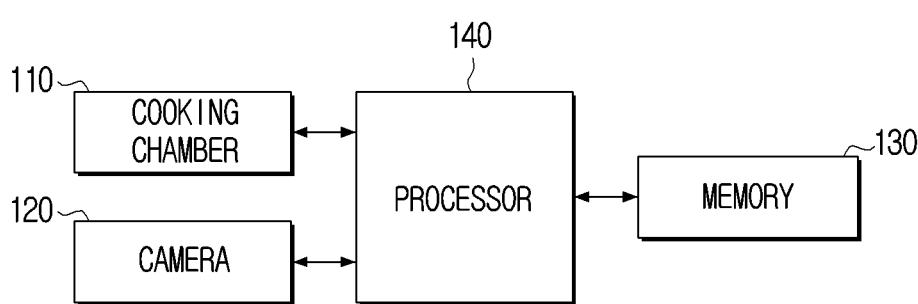
Figure 4:
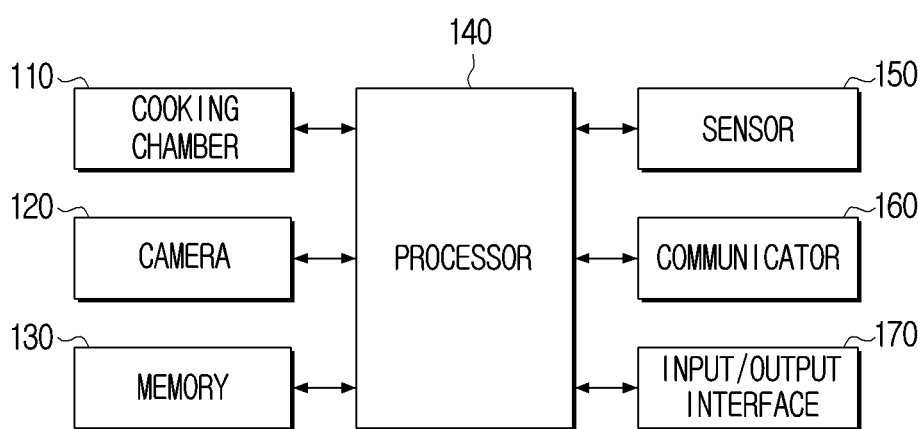
Figure 5:
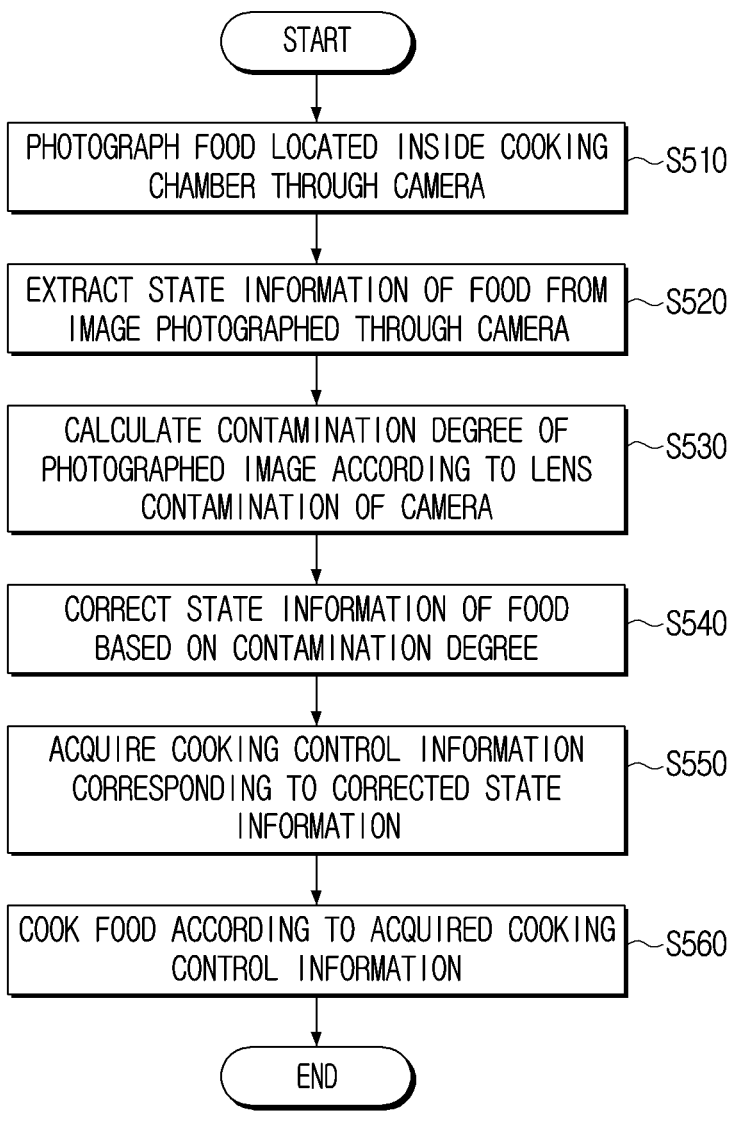
Figure 6:
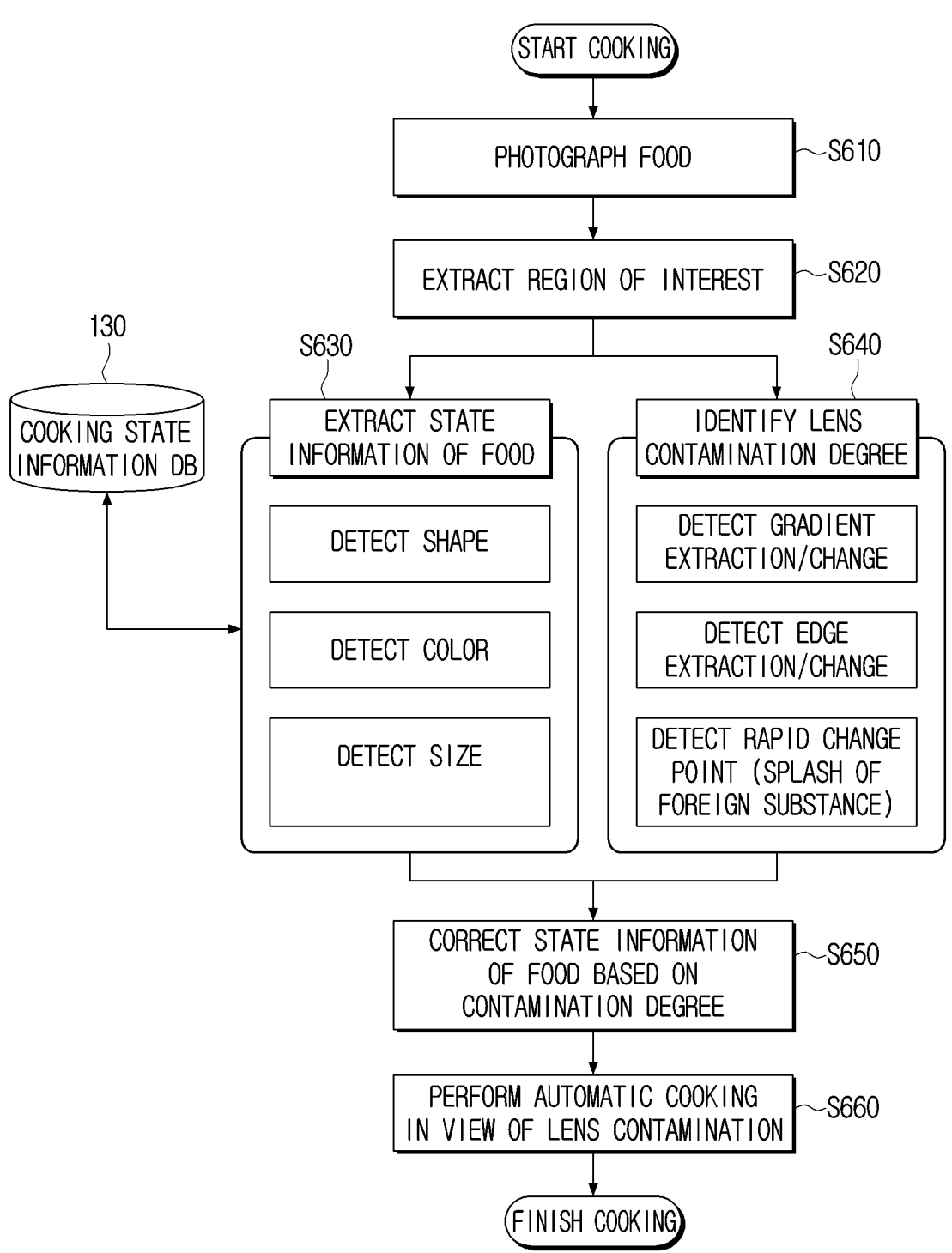
Figure 7:
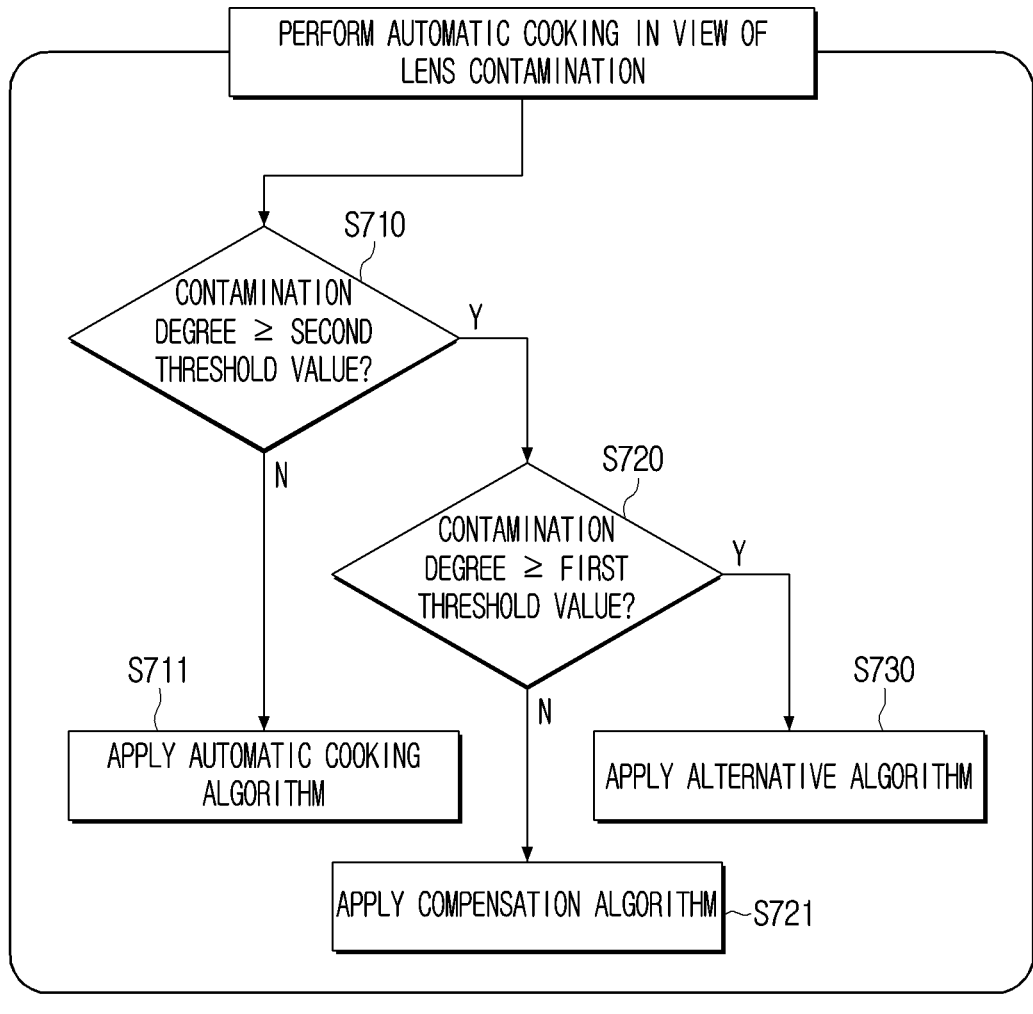
Figure 8:
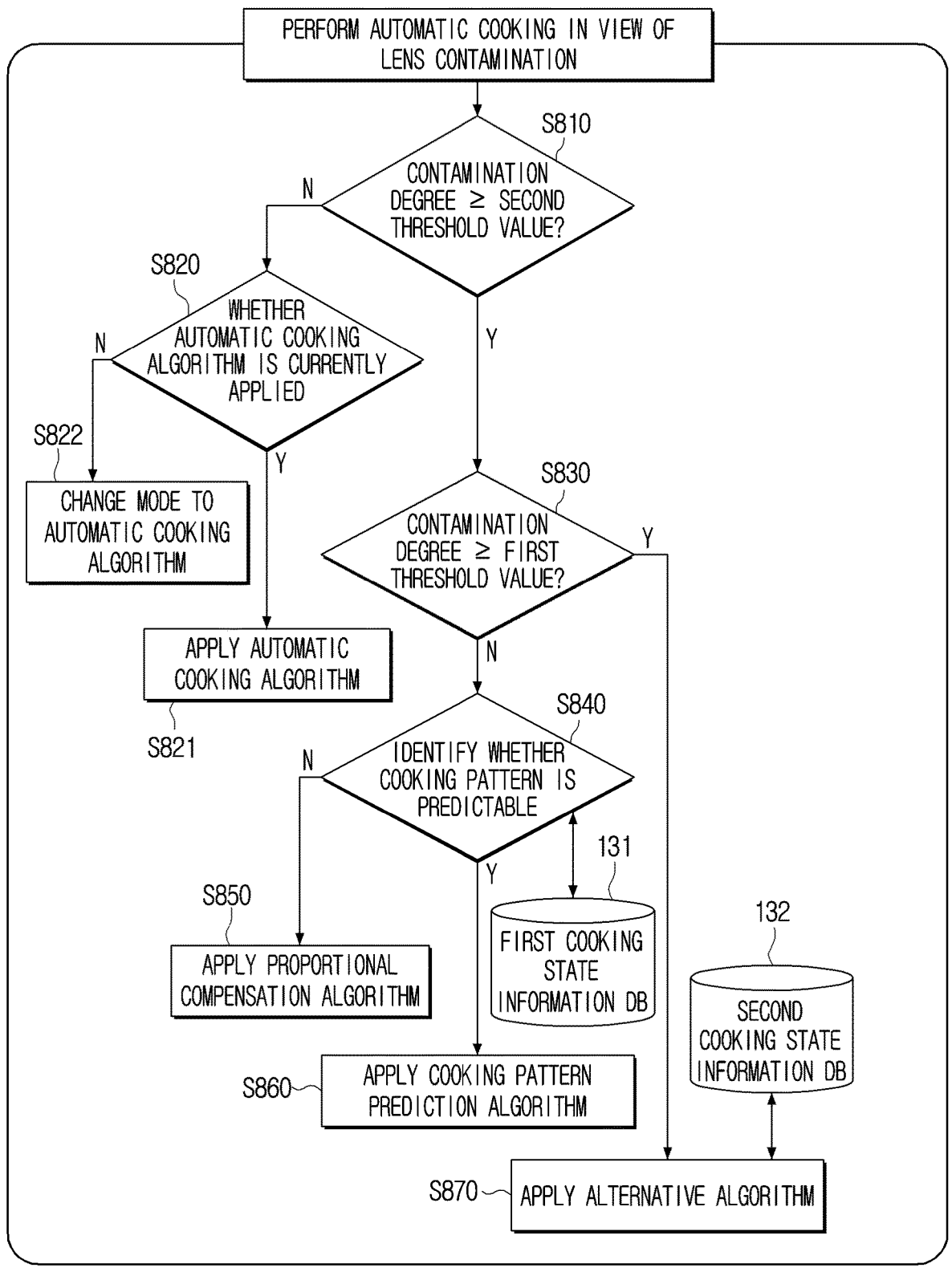
Figure 9:
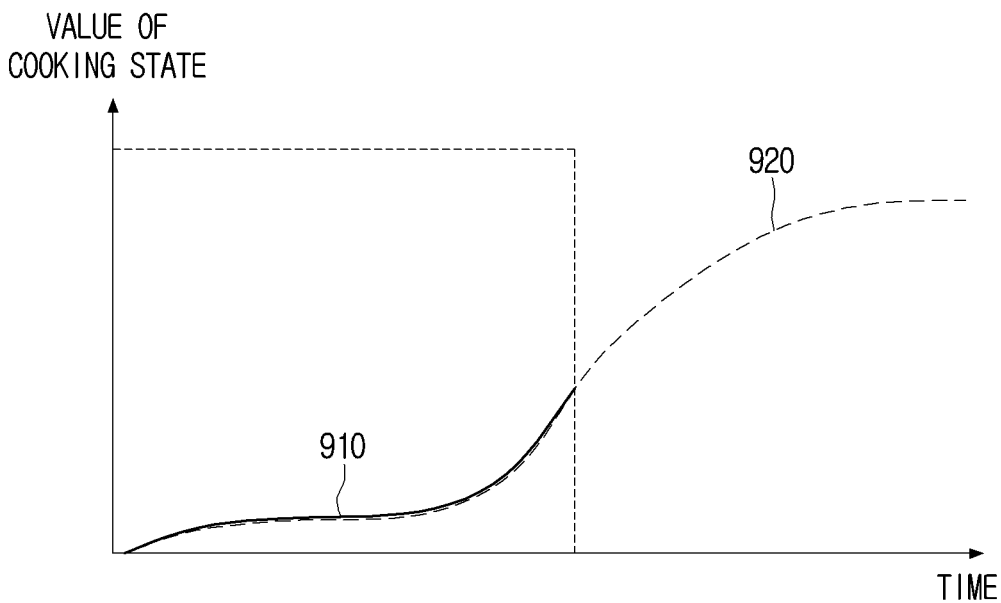
Figure 10:
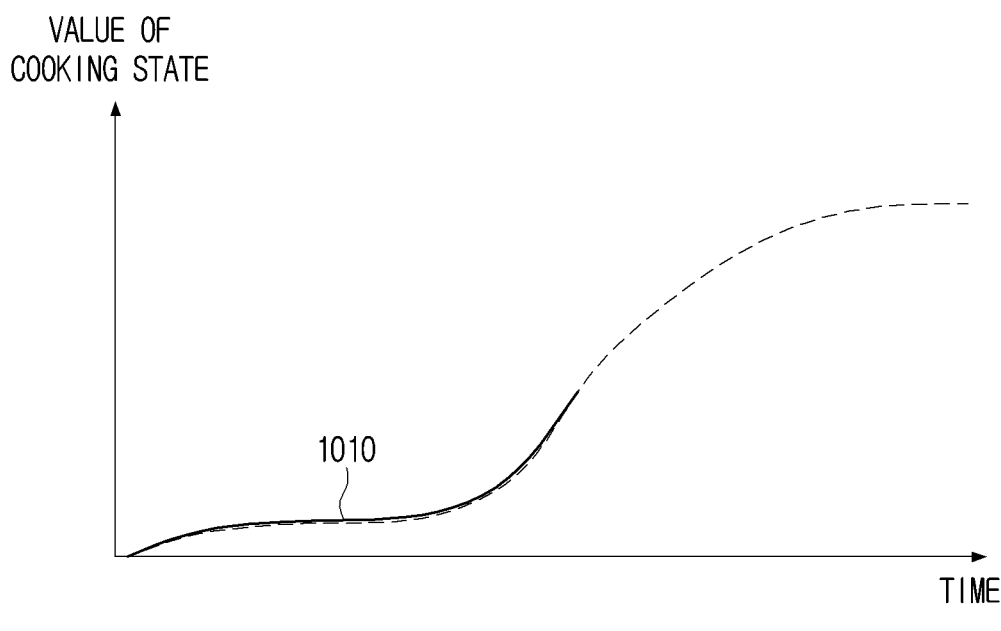
Figure 10:
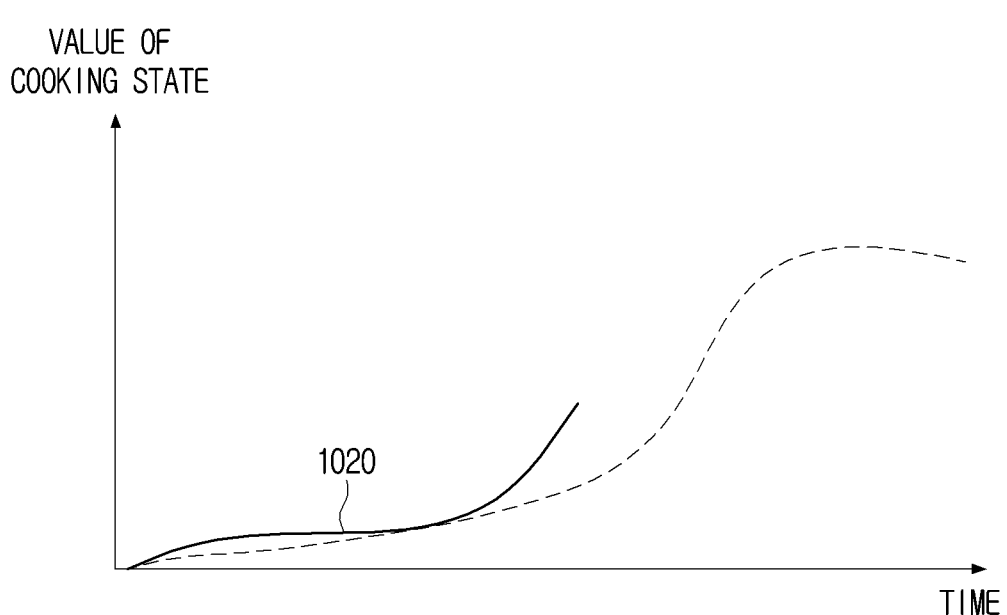
Figure 11:
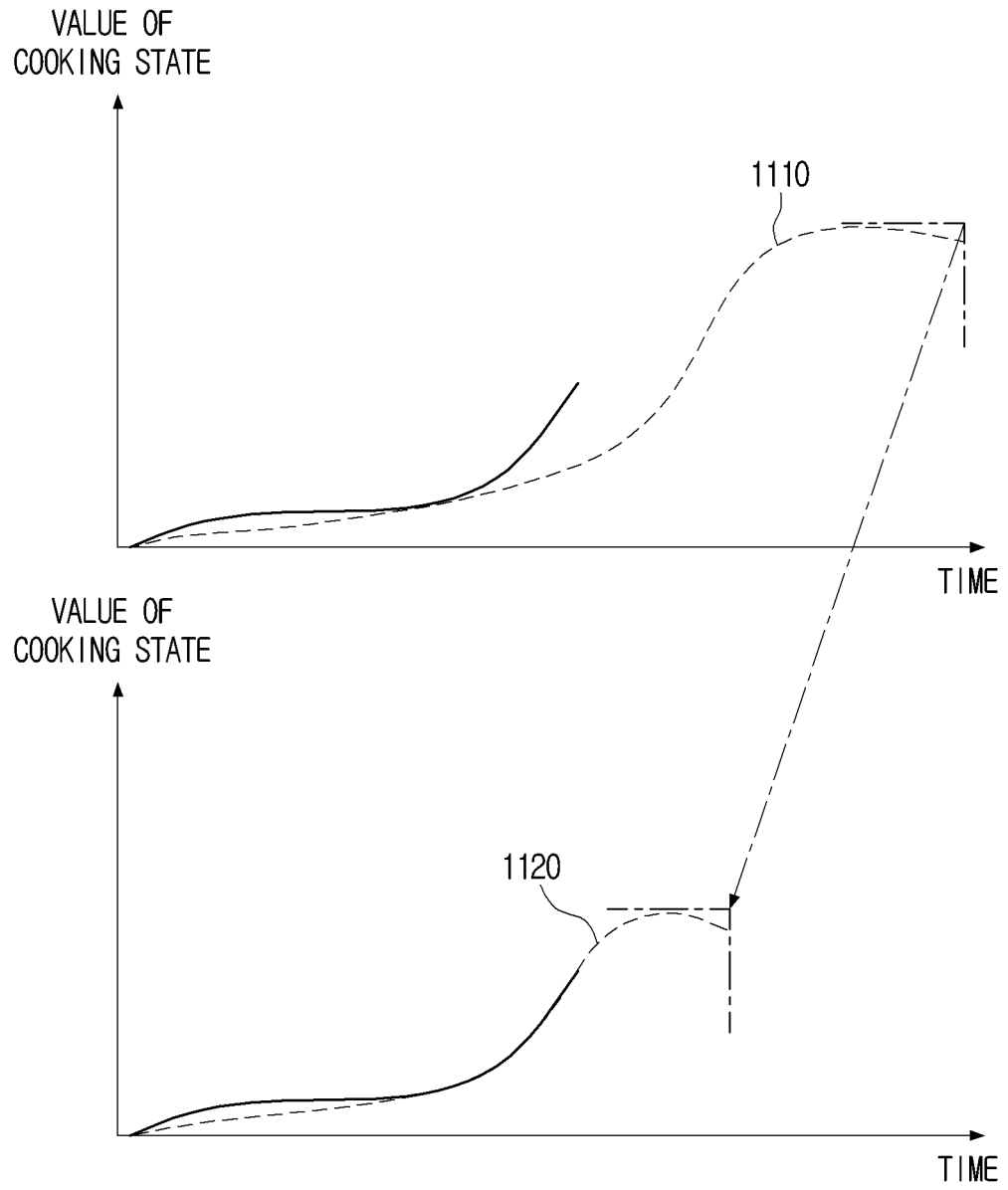
Figure 12:
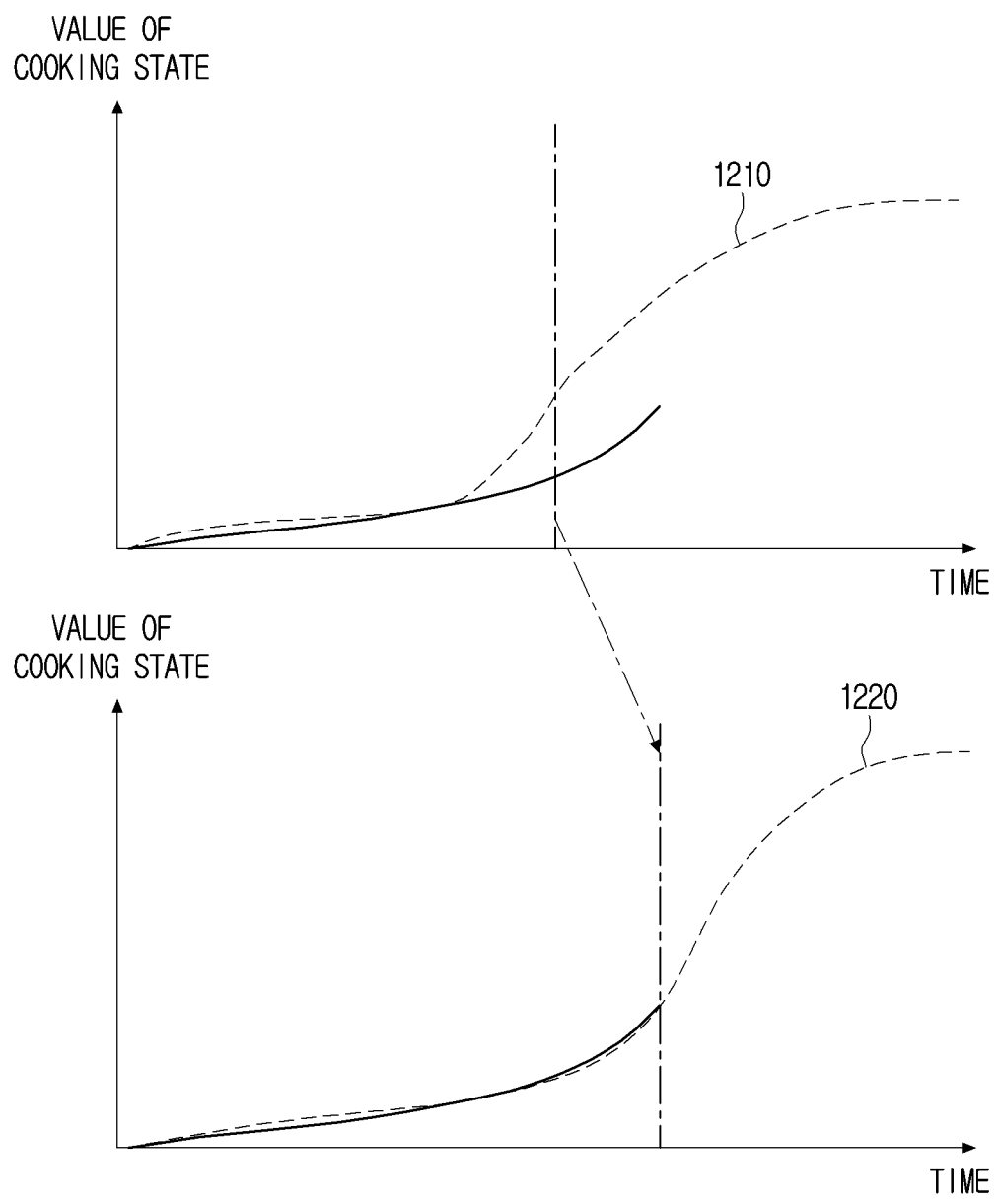

FIG. 2 is a view illustrating an image acquired by photographing food through a camera provided in a cooking apparatus according to an embodiment;

FIG. 3 is a block diagram illustrating a configuration of a cooking apparatus according to an embodiment;

FIG. 4 is a block diagram illustrating a configuration of a cooking apparatus according to an embodiment;

FIG. 5 is a flowchart illustrating a method of controlling a cooking apparatus according to an embodiment;

FIG. 6 is a view illustrating an operation of an electronic apparatus according to an embodiment;

FIG. 7 is a view illustrating an operation in which a cooking apparatus according to an embodiment of the disclosure performs automatic cooking in view of lens contamination;

FIG. 8 is a view illustrating in more detail an operation in which a cooking apparatus according to an embodiment of the disclosure performs automatic cooking in view of lens contamination;

FIG. 9 is a view illustrating an operation of searching for a food change pattern matching a change pattern of food state information acquired from a photographed image from a cooking state information DB stored in a memory;

FIG. 10 is a view illustrating an operation of confirming whether a change pattern of state information of food matches;

FIG. 11 is a view illustrating an operation of varying a change pattern of a stored cooking state information DB and confirming whether it matches a change pattern acquired from a photographed image; and FIG. 12 is a view illustrating an operation of locally varying a change pattern of a stored cooking state information DB and confirming whether it matches a change pattern acquired from a photographed image.

DETAILED DESCRIPTION

In the following description, same drawing reference numerals are used for the same elements even in different drawings. In the following description, well-known functions or constructions may not be described in detail if they would obscure the invention in unnecessary detail. Further, dimensions of various elements in the accompanying drawings may be arbitrarily selected for assisting in a comprehensive understanding.

The terms used in the disclosure and the claims may be general terms selected in view of the functions of the various example embodiments of the disclosure. However, such terms may vary depending on an intention of those skilled in the art, a legal or technical interpretation, an emergence of a new technology, or the like. Also, there may be some terms arbitrarily selected by an applicant. Such terms may be construed according to meanings defined in the disclosure, and may also be construed based on general contents of the disclosure and a typical technical concept in the art unless the terms are not specifically defined.

In the description of the disclosure, the order of each step should be understood as non-limiting unless a preceding step is to be logically and temporally performed before a subsequent step. In other words, except for exceptional cases described above, even if the process described as a subsequent step is performed before the process described as the preceding step, an essence of the disclosure is not affected, and the scope of the disclosure should also be defined regardless of the order of the steps.

The terms "have", "may have", "include", and "may include" used in the exemplary embodiments of the disclosure indicate the presence of corresponding features (for example, elements such as numerical values, functions, operations, or parts), and do not preclude the presence of additional features.

The terms such as "first," "second," and so on may be used to describe a variety of elements, but the elements should not be limited by these terms. The terms are only used to differentiate one component from other components. For example, the 'first' component may be named the 'second' component, and vice versa, without departing from the scope of the disclosure.

In the disclosure, components necessary for the description of each embodiment of the disclosure are described, and thus the disclosure is not necessarily limited thereto. Accordingly, some components may be changed or omitted, and the other components may be added. In addition, they may be distributed and arranged in different independent devices.

Various example embodiments of the disclosure will be described in greater detail below with reference to the accompanying drawings and contents described in the accompanying drawings, but the disclosure is not restricted or limited by the embodiments.

Hereinafter, various example embodiments will now be explained in detail with reference to the accompanying drawings.

Figure 1:
FIG. 1 is a perspective view schematically illustrating outside and inside of a cooking apparatus according to an embodiment.
Figure 1:
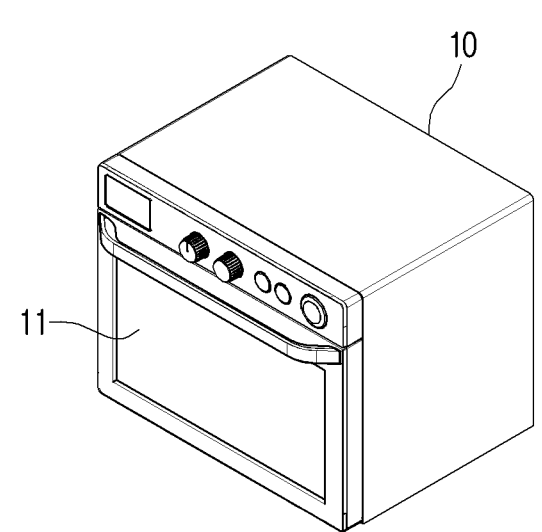
Figure 1:
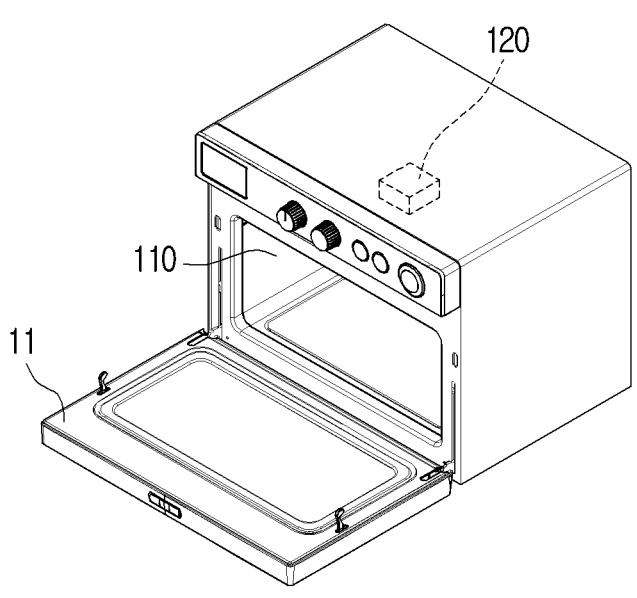

FIG. 1 is a perspective view schematically illustrating outside and inside of a cooking apparatus according to an embodiment.

Referring to FIG. 1, the cooking apparatus 100 may include a main body 10 forming an exterior, a cooking chamber 110 for accommodating food, a door 11 for opening and closing the cooking chamber 110, and a camera 120 for photographing the inside of the cooking chamber 110. The cooking apparatus 100 may be implemented as various devices that perform a cooking operation, such as an oven, a microwave oven, an air fryer, or the like.

The camera 120 may acquire a photographed image by photographing food located in the cooking chamber 110 while the food is being cooked in the cooking chamber 110. In that configuration, the camera 120 may be placed inside the cooking chamber 110 to photograph a surface of the food while the food is being cooked.

Meanwhile, a lens exposed in a direction of the cooking chamber 110 from the camera 120 may be included, and a surface of the lens may be contaminated by foreign substances such as vapor (e.g., vapor, gas . . . ) or oil splattered from the food, generated during a cooking process. If the lens is contaminated, the photographed image photographed by the camera 120 may be affected.

FIG. 2 is a view illustrating an image acquired by photographing food through a camera provided in a cooking apparatus according to an embodiment.

Referring to FIG. 2, a difference between a food photographed image 210 in a state in which a lens is not contaminated and food photographed images 221 and 222 in a state in which the lens is contaminated may be identified. In the image photographed while the lens is contaminated, a shape of the food may appear blurry 221 or a part of the food may be occluded 222.

The cooking apparatus 100 may extract state information of the food from the photographed image, and state information extracted from the image acquired by photographing the food while the lens is contaminated may not properly reflect an actual state of the food.

Accordingly, the cooking apparatus 100 according to an embodiment of the disclosure may correct state information of food according to a lens contamination degree, and propose a method of cooking using the corrected state information.

Meanwhile, features of the cooking apparatus 100 according to an embodiment of the disclosure are not limited to the case where the lens configuration of the camera 120 is contaminated, and may be applied to various cases that may affect the photographed image, such as a case that the other components (e.g., transparent screen) placed on a region between the camera 120 and food are contaminated.

FIG. 3 is a block diagram illustrating a configuration of a cooking apparatus according to an embodiment.

Referring to FIG. 3, the cooking apparatus 100 may include a cooking chamber 110, a camera 120, a memory 130, and a processor 140.

The cooking chamber 110 may include a space for accommodating food and is configured to perform a cooking operation on the food. The cooking chamber 110 may include a heating member for generating heat, a driving device capable of rotating and moving food, or the like.

The camera 120 may be provided inside the cooking chamber 110, and may photograph inside of the cooking chamber 110. Particularly, the camera 120 may photograph food accommodated in the cooking chamber 110.

Various instructions, programs, or data required for the operation of the cooking apparatus 100 or the processor 140 may be stored in the memory 130.

A plurality of cooking control information may be stored in the memory 130. Information on various food that can be cooked by the cooking apparatus 100 may be stored in the memory 130, and information on a cooking method for each food may be stored. For example, the cooking control method stored in the memory 130 may include information such as a cooking time, a cooking temperature, a cooking pattern, or the like.

The processor 140 may be electrically connected to the cooking chamber 110, the camera 120, and the memory 130 to control the overall operation of the cooking apparatus 100.

The processor 140 may control the camera 120 to photograph the food located inside the cooking chamber 110. The processor 140 may control the cooking chamber 110 to extract state information of food from the photographed image photographed by the camera 120, calculate a contamination degree of the photographed image according to lens contamination of the camera 120, correct the state information of the food based on the contamination degree, and acquire cooking control information corresponding to the corrected state information from the memory 130 to cook food according to the cooking control information.

FIG. 4 is a block diagram illustrating a configuration of a cooking apparatus according to an embodiment.

Referring to FIG. 4, the cooking apparatus 100 may include the cooking chamber 110, the camera 120, the memory 130, the processor 140, the sensor 150, the communicator 160, and an input/output interface 170. A detailed description of constitutional elements overlapping with the configuration illustrated in FIG. 3 among the configuration illustrated in FIG. 4 will be omitted.

The sensor 150 may be located in the cooking chamber 110 and sense cooking-related information while food is being photographed. The information related to cooking may include a temperature of the surface of the food located in the cooking chamber 110, a temperature inside the food, a moisture content of the surface of the food, a moisture content in the food, a temperature inside the cooking apparatus 100, internal humidity of the cooking apparatus 100, or the like. Accordingly, the sensor 150 may include a temperature probe sensor capable of measuring the internal temperature of food, a non-contact temperature sensor capable of measuring the surface temperature of food, a temperature sensor capable of sensing the internal temperature of the cooking apparatus 100, and a humidity sensor for sensing a change in the amount of water vapor inside the cooking apparatus 100. According to another embodiment, the sensor may be implemented as another sensor such as a weight sensor for sensing a weight of food located in the cooking apparatus 100 or a smoke sensor for sensing smoke generated in the cooking apparatus 100.

When a contamination degree of the lens of the camera 120 is equal to or greater than a first threshold, the processor 140 may acquire, from the memory 130, cooking control information corresponding to a result sensed by at least one other sensor 150 other than the camera 120. Accordingly, when the lens of the camera 120 is excessively contaminated and thus reliable state information of the food cannot be obtained from the photographed image, by using a sensing result of the sensor 150 rather than the photographed image, it may compensate for the disadvantage that the state information of food acquired through the photographed image is unreliable due to lens contamination.

The communicator 160 may transmit and receive various information by performing communication with an external device. For this operation, the communicator 160 may communicate with an external device through a local area network (LAN), an Internet network, and a mobile communication network, and may also communicate with an external device through various communication methods such as Bluetooth (BT), Bluetooth Low Energy (BLE), Wireless fidelity Direct (WI-FI Direct), Zigbee, NFC, or the like. For this operation, the communicator 160 may include various communication modules for performing network communication. For example, the communicator 160 may include a Bluetooth chip, a Wi-Fi chip, a wireless communication chip, or the like.

The input/output interface 170 may be configured to receive various user commands or provide various information to the user. For example, the cooking apparatus 100 may receive a user command for controlling the cooking apparatus 100 through the input/output interface 170 or receive a user command for transmitting to an external device. For example, a microphone for receiving a user's spoken voice, a display for outputting information in a visual form, a speaker for outputting information in an auditory form, or the like may be included.

FIG. 5 is a flowchart illustrating a method of controlling a cooking apparatus according to an embodiment.

Referring to FIG. 5, a method of controlling a cooking apparatus according to an embodiment of the disclosure includes photographing food located inside the cooking chamber 110 through the camera 120 (S510), extracting state information of the food from the photographed image (S520), calculating a contamination degree of the photographed image according to lens contamination of the camera 120 (S530), correcting the state information of the food based on the contamination degree (S540), acquiring cooking control information corresponding to the corrected state information from a cooking apparatus storing a plurality of cooking control information (S550) and cooking food according to the acquired cooking control information (S560).

The cooking apparatus 100 may photograph the food located inside the cooking chamber 110 through the camera 120 (S510).

In addition, the cooking apparatus 100 may extract state information of the food from the photographed image photographed by the camera 120 (S520).

The cooking apparatus 100 may calculate the contamination degree of the photographed image according to the lens contamination of the camera 120 (S530).

In that configuration, the cooking apparatus 100 may calculate the contamination degree by comparing a size of a region of interest in which the food is identified in the photographed image and a size of a region occluded due to lens contamination of the camera.

The cooking apparatus 100 may correct the state information of the food based on the contamination degree (S540).

In that configuration, the cooking apparatus 100 may correct the state information by adjusting a state value of at least one of shape, color, and size of the food in proportion to the contamination degree.

The cooking apparatus 100 may acquire cooking control information corresponding to the corrected state information from the cooking apparatus storing a plurality of cooking control information (S550).

In that configuration, when the contamination degree is equal to or greater than the first threshold, cooking control information corresponding to a result sensed by at least one other sensor may be acquired. The cooking apparatus 100 may estimate the state information of the food based on a temperature change sensed by the temperature sensor and a time counted by a timer, and acquire cooking control information corresponding to the estimated state information.

Also, when the contamination degree is less than the first threshold value and equal to or greater than a second threshold value, cooking control information corresponding to the state information corrected based on the contamination degree may be acquired.

Meanwhile, when the contamination degree is less than the second threshold, cooking control information corresponding to uncorrected state information may be acquired.

In addition, the cooking apparatus 100 may cook food according to the acquired cooking control information (S560).

FIG. 6 is a view illustrating an operation of an electronic apparatus according to an embodiment.

When cooking is started, the cooking apparatus 100 may photograph the food through the camera 120 (S610), and extract a region of interest, which is a region where the food is identified, from the photographed image (S620).

The cooking apparatus 100 may extract state information of the food from the photographed image photographed by the camera 120 (S630) and identify lens contamination degree of the camera 120 (S640).

The cooking apparatus 100 may extract state information of the food from the region of interest of the photographed image (S630). The cooking apparatus 100 may acquire state values such as a shape, color, and size of the food. For example, the cooking apparatus 100 may acquire a size value of the food by identifying a region occupied by the food on the photographed image by extracting a boundary line of the food from the photographed image, and acquire color values of pixels corresponding to the region of interest of the photographed image in relation to a color of the food.

The extracted food state information may be matched with information included in a cooking state information database DB stored in the memory 130. For example, a plurality of food change patterns corresponding to each of a plurality of cooking control information may be stored in the memory 130, and the processor 140 may acquire the change pattern of the state information by accumulating the state information of the food for a predetermined time, and search a food change pattern matching the acquired change pattern from the memory 130 to acquire cooking control information corresponding to the searched food change pattern from the memory 130. A detailed description related thereto will be described later with reference to FIGS. 9 to 12.

The cooking apparatus 100 may identify a lens contamination degree by calculating a contamination degree according to the lens contamination of the camera 120 from the photographed image (S640). The cooking apparatus 100 may identify the degree to which the lens of the camera 120 is occluded by vapor (e.g., vapor, gas . . . ) by extracting gradients of adjacent pixels on the photographed image. Also, the cooking apparatus 100 may identify a region where the lens of the camera 120 is occluded by a foreign substance by extracting a boundary line or sensing a change point on the photographed image.

The cooking apparatus 100 may calculate the contamination degree in various ways. For example, the cooking apparatus 100 may calculate the contamination degree by comparing a size of a region of interest in which the food is identified in the photographed image and a size of a region occluded due to lens contamination of the camera 120. In that configuration, the contamination degree may be calculated as a ratio of the size of the occluded region to the size of the region of interest. According to another embodiment, the cooking apparatus 100 may calculate the ratio of the size of the region occluded by the lens contamination of the camera 120 to an overall size of the photographed image, as the contamination degree.

Meanwhile, the cooking apparatus 100 may correct the state information of the food based on the contamination degree (S650). In that configuration, the cooking apparatus 100 may adjust the state value included in the food state information based on the contamination degree. For example, the cooking apparatus 100 may adjust a state value of at least one of a shape, a color, and a size of the food in proportion to the degree of contamination. When the contamination degree is the ratio of the size of the region occluded by a foreign substance to the overall size of the photographed image, the cooking apparatus 100 may adjust the size value of the food to increase in proportion to the contamination degree value. For example, when the region occluded by foreign substances is 40% of a total size of the photographed image, the size of the food may be adjusted to increase by 40% by estimating that the size of the food is occluded by 40%. Accordingly, the state information of the food based on the contamination degree may be corrected.

In addition, the cooking apparatus 100 may perform automatic cooking in view of lens contamination (S660). A detailed description related thereto will be described later with reference to FIGS. 7 to 8.

FIG. 7 is a view illustrating an operation in which a cooking apparatus according to an embodiment of the disclosure performs automatic cooking in view of lens contamination.

Referring to FIG. 7, the cooking apparatus 100 may perform a cooking operation by applying different cooking algorithms according to the contamination degree of the lens of the camera 120.

When the contamination degree is less than the second threshold value (S710, N), the cooking apparatus 100 may apply the automatic cooking algorithm by identifying the lens of the camera 120 is not contaminated (S711). The automatic cooking algorithm may refer to an algorithm for controlling the cooking apparatus 100 according to cooking control information pre-stored in the memory 130.

When the contamination degree of the lens of the camera 120 is less than the first threshold value and greater than or equal to the second threshold value (S720, N), the cooking apparatus 100 may acquire cooking control information corresponding to the state information corrected based on the contamination degree from the memory 130, and may apply a compensation algorithm for controlling the cooking apparatus 100 to perform a cooking operation according to the acquired cooking control information (S721).

Meanwhile, when the contamination degree is equal to or greater than the first threshold value (S720, Y), cooking control information corresponding to a result sensed by at least one other sensor may be acquired from the memory 130, and an alternative algorithm for controlling the cooking apparatus 10 may be applied to perform a cooking operation according to the acquired cooking control information (S730).

FIG. 8 is a view illustrating in more detail an operation in which a cooking apparatus according to an embodiment of the disclosure performs automatic cooking in view of lens contamination.

Referring to FIG. 8, when the contamination degree is less than the second threshold value (S810, N), which means that when it is identified that the lens of the camera 120 is not contaminated, the cooking apparatus 100 may identify whether an automatic cooking algorithm is being applied to the current cooking apparatus 100 (S820). When it is identified that the current automatic cooking algorithm is applied (S820, Y), the cooking apparatus 100 may maintain the current state of applying the automatic cooking algorithm (S821), and when an algorithm other than the automatic cooking algorithm is applied (S820, N), the cooking apparatus 100 may change the mode to the automatic cooking algorithm (S822).

Meanwhile, when the contamination degree is greater than or equal to the second threshold value (S810, Y), which means that when it is identified that the lens of the camera 120 is contaminated, the cooking apparatus 100 may identify whether the contamination degree is greater than or equal to the first threshold value greater than the second threshold value (S830).

When the contamination degree is equal to or greater than the first threshold value, it may mean that the lens of the camera 120 is excessively contaminated, and thus reliable state information of the food cannot be acquired from the photographed image. Accordingly, when the contamination degree is equal to or greater than the first threshold value (S830, Y), cooking control information corresponding to a result sensed by at least one other sensor 150 may be acquired from a memory 132 for storing the second cooking state information DB, and an alternative algorithm for controlling the cooking apparatus 10 may be applied to perform a cooking operation according to the acquired cooking control information (S870).

Meanwhile, when the contamination degree is less than the first threshold value and greater than or equal to the second threshold value (S830, N), the cooking apparatus 100 may correct the state information based on the contamination degree and acquire the cooking control information corresponding to the corrected state information from the first cooking state information DB stored in a memory 131. In that configuration, whether or not a cooking pattern can be predicted may be identified (S840) according to whether or not cooking control information matching the corrected state information is searched from the memory 131. A detailed description related to a search operation for cooking control information matching the state information will be described below with reference to FIGS. 9 to 12.

When it is identified that the cooking pattern is predictable from the state information of the food extracted from the photographed image photographed by the camera 120 (S840, Y), the cooking apparatus 100 may perform the cooking operation by applying a cooking pattern prediction algorithm (S860). In that configuration, the cooking pattern prediction algorithm may search, from the memory 131, for a food change pattern matching the change pattern of the state information of the food, and perform the cooking operation according to the cooking control information corresponding to the searched food change pattern.

Meanwhile, if it is identified that the cooking pattern is unpredictable (S840, N), the cooking apparatus 100 may perform a cooking operation by applying a proportional compensation algorithm (S850). In that configuration, the proportional compensation algorithm may correct the state information (e.g., state values related to shape, color, and size) of the food in proportion to the contamination degree, and perform a cook operation by acquiring cooking control information corresponding to the corrected state information from the memory 131.

Accordingly, a cooking algorithm may be applied in different ways according to a reliability of the food state information that can be extracted from the photographed image.

FIG. 9 is a view illustrating an operation of searching for a food change pattern matching a change pattern of food state information acquired from a photographed image from a cooking state information DB stored in a memory.

Referring to FIG. 9, the processor 140 may acquire a change pattern 910 of state information by accumulating state information of food for a predetermined time, and search, from the memory 130, a food change pattern 920 matching the acquired change pattern 910. When the change pattern 920 matching the acquired change pattern 910 is searched, a cooking operation may be performed by acquiring cooking control information corresponding to the searched food change pattern 920 from the memory 130.

Accordingly, a change in the cooking state may be predicted by analyzing the state information of the food, and cooking suitable for the food may be automatically performed by performing a cooking operation according to the predicted result.

Meanwhile, searching for a matching change pattern from the food change pattern stored in the memory 130 may be failed.

FIG. 10 is a view illustrating an operation of confirming whether a change pattern of state information of food matches.

Referring to FIG. 10, there may be a change pattern 1010 of state information that matches the food change pattern of the cooking state information DB stored in the memory 130, but there may be a change pattern of state information that does not search a matching change pattern 1020. In that configuration, the processor 140 may search for a matching change pattern by varying the change pattern acquired from the photographed image or the change pattern stored in the memory 130.

FIG. 11 is a view illustrating an operation of varying a change pattern of a stored cooking state information DB and confirming whether it matches a change pattern acquired from a photographed image.

When the processor 140 fails to search, from the memory 130, for a food change pattern matching the acquired change pattern, the processor 140 may acquire a matching change pattern by matching the acquired change pattern with a change pattern 1120 varying the change pattern 1110 stored in the memory 130.

Referring to FIG. 11, the variable change pattern 1120 and the change pattern acquired from the photographed image may be matched by varying the overall scale of the stored change pattern 1110.

Meanwhile, referring to FIG. 12, the variable change pattern 1220 and the change pattern acquired from the photographed image may be matched by locally varying a scale of the stored change pattern 1210.

Meanwhile, when the processor 140 fails to search, from the memory 130, a food change pattern matching the acquired change pattern, the processor 140 may acquire a matching change pattern by searching, from the memory 130, a food change pattern matching the acquired change pattern with the variable change pattern.

According to various embodiments described above, computer instructions for performing processing operations of the cooking apparatus according to the various embodiments described above may be stored in a non-transitory computer-readable medium. The computer instructions stored in the non-transitory computer-readable medium may cause a particular device to perform processing operations on the device according to the various embodiments described above when executed by the processor of the particular device.

The non-transitory computer readable recording medium refers to a medium that stores data and that can be read by devices. For example, the above-described various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), or the like, and may be provided.

The methods according to various embodiments described above may be provided as a part of a computer program product. The computer program product may be traded between a seller and a buyer. The computer program product may be distributed in a form of the machine-readable storage media (e.g., compact disc read only memory (CD-ROM) or distributed online through an application store (e.g., PlayStore™). In a case of the online distribution, at least a portion of the computer program product may be at least temporarily stored or provisionally generated on the storage media such as a manufacturer's server, the application store's server, or a memory in a relay server.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. A cooking apparatus comprising:
   a cooking chamber configured to receive food;
   a camera to photograph inside the cooking chamber, the camera having a lens;
   a memory configured to store a plurality of cooking control information used to cook the food, each of the plurality of cooking control information corresponding to at least one food change pattern; and a processor configured to control the camera to photograph the food inside the cooking chamber, wherein the processor is further configured to:

extract state information of the food from the photographed image;

determine a contamination degree of the lens of the camera based on the photograph image;

correct the state information of the food based on the determined contamination degree;

acquire a change pattern of the corrected state information by accumulating the corrected state information of the food for a predetermined time;

identify at least one food change pattern based on the change pattern of the corrected state information;

identify first cooking control information based on the at least one food change pattern;

control the cooking chamber to cook the food according to the acquired first cooking control information, and wherein the identifying of the at least one food change pattern comprises identifying a food change pattern matching the acquired change pattern with variation based on the acquired change pattern not corresponding to any of the at least one food change pattern.

2. The cooking apparatus of claim 1, wherein the processor is further configured to:

based on the determined contamination degree being equal to or greater than a first threshold value, acquire second cooking control information corresponding to a result sensed by at least one another sensor stored in the memory; and control the cooking chamber to cook the food according to the acquired second cooking control information.

3. The cooking apparatus of claim 2, wherein the processor is further configured to:

based on the contamination degree being less than the first threshold value and greater than or equal to a second threshold value, acquire cooking control information corresponding to state information corrected based on the contamination degree from the memory, and based on the contamination degree being less than the second threshold value, acquire cooking control information corresponding to uncorrected state information from the memory.

4. The cooking apparatus of claim 1, further comprising:

a temperature sensor; and a timer, wherein the processor is further configured to:

based on the determined contamination degree being equal to or greater than a first threshold value, estimate the state information of the food based on a temperature change sensed by the temperature sensor and a time counted by the timer, and acquire cooking control information corresponding to the estimated state information from the memory.

5. The cooking apparatus of claim 1, wherein the processor is further configured to:

determine the contamination degree by comparing a size of a region of interest in which the food is identified in the photographed image and a size of a region occluded due to contamination of the lens of the camera, and correct the state information by adjusting a state value of at least one of a shape, a color, and a size of the food in proportion to the contamination degree.

6. A method for controlling a cooking apparatus having a memory configured to store a plurality of cooking control information used to cook food, each of the plurality of cooking control information corresponding to at least one food change pattern the method comprising:

photographing food inside a cooking chamber through a camera of the cooking apparatus;

extracting state information of the food from photographed image photographed by the camera;

determining a contamination degree of a lens of the camera based on the photograph image;

correcting the state information of the food based on the determined contamination degree;

acquiring a change pattern of the corrected state information by accumulating the corrected state information of the food for a predetermined time;

identifying at least one food change pattern based on the change pattern of the corrected state information;

identifying first cooking control information based on the at least one food change pattern; and controlling a cooking of the food according to the acquired cooking control information, wherein the identifying of the at least one food change pattern comprises identifying a food change pattern matching the acquired change pattern with variation based on the acquired change pattern not corresponding to any of the at least one food change pattern.

7. The method of claim 6, wherein the acquiring includes, based on the determined contamination degree being equal to or greater than a first threshold value, acquiring first cooking control information corresponding to a result sensed by at least one another sensor, and wherein the cooking includes cooking the food according to the acquired first cooking control information.

8. The method of claim 7, wherein the acquiring includes, based on the determined contamination degree being less than the first threshold value and greater than or equal to a second threshold value, acquiring second cooking control information corresponding to state information corrected based on the contamination degree, and based on the determined contamination degree being less than the second threshold value, acquiring third cooking control information corresponding to uncorrected state information.

9. The method of claim 6, wherein the cooking apparatus further comprises:

a temperature sensor; and a timer, wherein the acquiring includes, based on the determined contamination degree being equal to or greater than a first threshold value, estimating the state information of the food based on a temperature change sensed by the temperature sensor and a time counted by the timer, and acquiring cooking control information corresponding to the estimated state information.

10. The method of claim 6, wherein the determining the contamination degree includes calculating the contamination degree by comparing a size of a region of interest in which the food is identified in the photographed image and a size of a region occluded due to contamination of the lens of the camera, and wherein the correcting includes correcting the state information by adjusting a state value of at least one of a shape, a color, and a size of the food in proportion to the contamination degree.

11. A computer program product comprising a non-transitory computer readable medium that comprises one or more computer executable instructions that when executed by one or more processors cause the one or more processors of a cooking apparatus to perform a method, the cooking apparatus having a memory configured to store a plurality of cooking control information used to cook food, each of the plurality of cooking control information corresponding to at least one food change pattern, the method comprising:

wherein the program includes:

photographing food inside a cooking chamber through a camera of the cooking apparatus;

extracting state information of the food from the photographed image photographed by the camera;

determining a contamination degree of a lens of the camera based on the photograph image;

correcting the state information of the food based on the determined contamination degree;

acquiring a change pattern of the corrected state information by accumulating the corrected state information of the food for a predetermined time;

identifying at least one food change pattern based on the change pattern of the corrected state information;

identifying first cooking control information based on the at least one food change pattern; and controlling a cooking of the food according to the acquired cooking control information wherein the identifying of the least one food change pattern comprises identifying a food change pattern matching the acquired change pattern with variation based on the acquired change pattern not corresponding to any of the at least one food change pattern.

12. The cooking apparatus of claim 1, wherein the processor is further configured to identify the food change pattern matching the acquired change pattern by varying a scale of at least one food change pattern stored in the memory based on the acquired change pattern not corresponding to any of the at least one food change pattern.

13. The method of claim 6, wherein, the identifying the least one food change pattern comprising identifying the food change pattern matching the acquired change pattern by varying a scale of at least one food change pattern stored in the memory based on the acquired change pattern not corresponding to any of the at least one food change pattern.

14. The cooking apparatus of claim 1, wherein the processor is further configured to, based on the determined contamination degree being less than a threshold value, control the cooking of the food according to cooking control information pre-stored in the memory by applying an automatic cooking algorithm.

15. The method of claim 6, wherein, the controlling the cooking of the food comprising, based on determined contamination degree being less than a threshold value, controlling the cooking of the food according to cooking control information pre-stored in the memory by applying an automatic cooking algorithm.

\* \* \* \* \*